United States Patent
Kurosaki et al.

(10) Patent No.: US 12,031,645 B2
(45) Date of Patent: Jul. 9, 2024

(54) SEALING MEMBER AND PIPE JOINT

(71) Applicant: NIPPON PILLAR PACKING CO., LTD., Osaka (JP)

(72) Inventors: Ayumi Kurosaki, Osaka (JP); Shingo Higuchi, Osaka (JP); Kazukiyo Teshima, Osaka (JP); Kiyotaka Ohmae, Osaka (JP); Masashi Katanaya, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 88 days.

(21) Appl. No.: 17/792,748

(22) PCT Filed: Jan. 14, 2021

(86) PCT No.: PCT/JP2021/001003
§ 371 (c)(1),
(2) Date: Jul. 14, 2022

(87) PCT Pub. No.: WO2021/186865
PCT Pub. Date: Sep. 23, 2021

(65) Prior Publication Data
US 2023/0039578 A1 Feb. 9, 2023

(30) Foreign Application Priority Data

Mar. 18, 2020 (JP) .................................. 2020-047938

(51) Int. Cl.
*F16L 19/05* (2006.01)
*F16J 15/10* (2006.01)

(52) U.S. Cl.
CPC ............... *F16L 19/05* (2013.01); *F16J 15/10* (2013.01)

(58) Field of Classification Search
CPC ......... F16L 19/05; F16L 19/06; F16L 19/061; F16L 19/065; F16L 19/04; F16L 19/041;
(Continued)

(56) References Cited

U.S. PATENT DOCUMENTS 10,145,497 B2 *  12/2018  Fujii ..................... F16L 47/041
2008/0000533 A1    1/2008  Katsura
(Continued)

FOREIGN PATENT DOCUMENTS

| JP | 2006-132662 A | 5/2006 |
| JP | 6259873 B1 | 1/2018 |
| JP | 2018-168947 A | 11/2018 |

OTHER PUBLICATIONS

International Search Report dated Feb. 22, 2021 issued in corresponding PCT/JP2021/001003 application (2 pages).

*Primary Examiner* — Aaron M Dunwoody
(74) *Attorney, Agent, or Firm* — Millen, White, Zelano & Branigan P.C.; William F. Nixon (57) ABSTRACT

An inner ring 4 of a pipe joint 1 includes a cylindrical body portion 5 having a communication hole 5a for providing communication between flow passage holes 2c and 8a of a joint body 2 and a tube 8, and an annular primary sealing portion 11 projecting from a radially inner side of an axially outer end portion of the body portion 5 toward an axially outer side and to be press-fitted into an annular primary sealing groove 2d formed on the joint body 2. The primary sealing portion 11 is formed so as to be tapered from an axially inner end thereof toward an axially outer end thereof in an axial cross-sectional view, and has a flat surface 11c extending from a radially outer end 11b of the axially outer end thereof toward the radially inner side.

6 Claims, 6 Drawing Sheets

(58) Field of Classification Search
CPC ... F16L 19/043; F16L 19/046; F16L 19/0212; F16L 19/0218; F16J 15/10
See application file for complete search history.

(56) References Cited

U.S. PATENT DOCUMENTS

2019/0193315 A1  6/2019  Miyamoto et al.
2019/0331272 A1  10/2019  Fujii et al.

* cited by examiner

SEALING MEMBER AND PIPE JOINT

TECHNICAL FIELD

The present invention relates to a sealing member and a pipe joint.

BACKGROUND ART

In manufacturing processes in various technical fields such as semiconductor manufacturing, medical/pharmaceutical manufacturing, and food processing/chemical industries, in a pipe path through which fluids such as chemical solutions, high-purity liquids, ultrapure water, or cleaning solutions flow, for example, a pipe joint made of a synthetic resin is used as a connection structure that connects flow passage holes formed in two fluid devices. As such a pipe joint, a pipe joint that includes a joint body mounted on the outer circumferential side of an end portion of a tube (pipe), a union nut mounted on the outer circumferential side of the joint body, and an inner ring mounted on the inner circumferential side of the end portion of the tube, is known (see, for example, PATENT LITERATURE 1).

The inner ring has a cylindrical body portion having a communication hole formed therein for providing communication between the flow passage holes, an annular primary sealing portion formed on the radially inner side of an axially outer end portion of the body portion so as to project toward the axially outer side, and an annular secondary sealing portion formed on the radially outer side of the axially outer end portion of the body portion so as to project toward the axially outer side. The primary sealing portion and the secondary sealing portion are press-fitted into an annular primary sealing groove and an annular secondary sealing groove formed on the joint body, respectively. Accordingly, sealing performance between the joint body and the inner ring is ensured to prevent a fluid from leaking to the outside.

CITATION LIST

Patent Literature

PATENT LITERATURE 1: Japanese Laid-Open Patent Publication No. 2018-168947

SUMMARY OF THE INVENTION

Technical Problem

A cross-sectional shape of the primary sealing portion in the pipe joint is formed so as to be gradually tapered from the axially inner end thereof toward the axially outer end thereof, and the axially outer end of the primary sealing portion is sharply formed, so that the thickness in the radial direction of the primary sealing portion is the thinnest at the axially outer end thereof. Therefore, when press-fitting the primary sealing portion into the primary sealing groove, an axially outer end portion of the primary sealing portion may become deformed so as to fall down (protrude) toward the radially inner side (communication hole side) due to insufficient strength. When such falling down occurs, a fluid may enter between the contact surfaces of the axially outer end portion of the primary sealing portion and the primary sealing groove due to insufficient surface pressure between the contact surfaces. Then, the fluid remaining between the contact surfaces reduces the replaceability of the fluid flowing through the pipe path, causing adverse effects such as taking time for flushing the pipe path.

The present invention has been made in view of such circumstances, and an object of the present invention is to provide a sealing member and a pipe joint that can inhibit an axially outer end portion of a primary sealing portion from falling down toward a radially inner side.

Solution to Problem (1) A sealing member of the present invention is a sealing member for sealing and connecting flow passage holes formed in two fluid devices, respectively, the sealing member including: a cylindrical body portion having a communication hole for providing communication between the flow passage holes; an annular primary sealing portion projecting from a radially inner side of an axially outer end portion of the body portion toward an axially outer side and to be press-fitted into an annular primary sealing groove formed at a connection end portion of the flow passage hole of one of the fluid devices; and an annular secondary sealing portion projecting from a radially outer side of the axially outer end portion of the body portion toward the axially outer side and to be press-fitted into an annular secondary sealing groove formed on the radially outer side with respect to the primary sealing groove in said one of the fluid devices, wherein the primary sealing portion is formed so as to be tapered from an axially inner end thereof toward an axially outer end thereof in an axial cross-sectional view, and has a flat surface extending from a radially outer end of the axially outer end thereof toward the radially inner side.

In the sealing member of the present invention, the primary sealing portion formed so as to be tapered from the axially inner end thereof toward the axially outer end thereof has the flat surface extending from the radially outer end toward the radially inner side of the axially outer end, so that the thickness in the radial direction at the axially outer end of the primary sealing portion can be larger than that in the conventional art. Accordingly, the strength at an axially outer end portion of the primary sealing portion is higher than that in the conventional art. Thus, when press-fitting the primary sealing portion into the primary sealing groove, it is possible to inhibit the axially outer end portion of the primary sealing portion from falling down toward the radially inner side (communication hole side). As a result, the surface pressure between the contact surfaces of the axially outer end portion of the primary sealing portion and the primary sealing groove is higher than that in the conventional art, so that it is possible to inhibit a fluid from entering between these contact surfaces.

(2) An inner circumferential surface of the primary sealing portion is preferably inclined with respect to an inner circumferential surface of the body portion such that a diameter thereof gradually increases from an axially inner end thereof toward an axially outer end thereof.

In this case, when press-fitting the primary sealing portion into the primary sealing groove, even if the primary sealing portion falls down toward the radially inner side, it is possible to inhibit the inner circumferential surface of the primary sealing portion from protruding to the radially inner side with respect to the inner circumferential surface of the body portion. As a result, it is possible to inhibit the flow of the fluid in the communication hole of the body portion from being hindered by the inner circumferential surface of the primary sealing portion.

(3) The primary sealing portion preferably has a chamfered portion formed at a corner portion formed by the inner circumferential surface and the flat surface of the primary sealing portion.

In this case, even if the fluid enters a recess formed between the corner portion of the primary sealing portion and the primary sealing groove, the fluid in the recess easily flows to the communication hole side due to the chamfered portion, so that it is possible to inhibit the fluid from remaining in the recess.

(4) A radial dimension from the radially outer end of the axially outer end of the primary sealing portion to an inner circumferential surface of the secondary sealing portion is preferably larger than a thickness dimension in a radial direction at the axially outer end of the primary sealing portion.

In this case, due to the formation of the flat surface at the axially outer end of the primary sealing portion, a thickness portion in the radial direction, of the fluid device, which is located between the primary sealing portion and the secondary sealing portion (thickness portion between the primary sealing groove and the secondary sealing groove) can be prevented from being excessively thin. As a result, it is possible to suppress a decrease in the contact surface pressure between the secondary sealing portion and the secondary sealing groove due to insufficient strength of the thickness portion, so that it is possible to suppress a decrease in the sealing performance by the secondary sealing portion and the secondary sealing groove.

(5) The thickness dimension in the radial direction at the axially outer end of the primary sealing portion is preferably not less than 10% and not greater than 30% of a thickness dimension in the radial direction at the axially inner end of the primary sealing portion.

In this case, by setting the thickness dimension in the radial direction at the axially outer end of the primary sealing portion so as to be not less than 10% of the thickness dimension in the radial direction at the axially inner end of the primary sealing portion, the strength at the axially outer end portion of the primary sealing portion is further increased. Accordingly, when press-fitting the primary sealing portion into the primary sealing groove, it is possible to further inhibit the axially outer end portion of the primary sealing portion from falling down toward the radially inner side. As a result, the surface pressure between the contact surfaces of the axially outer end portion of the primary sealing portion and the primary sealing groove is further increased, so that it is possible to effectively inhibit the fluid from entering between these contact surfaces.

Moreover, by setting the thickness dimension in the radial direction at the axially outer end of the primary sealing portion so as to be not greater than 30% of the thickness dimension in the radial direction at the axially inner end of the primary sealing portion, the thickness portion in the radial direction, of the fluid device, which is located between the primary sealing portion and the secondary sealing portion (thickness portion between the primary sealing groove and the secondary sealing groove) can be prevented from being excessively thin. Accordingly, it is possible to further suppress a decrease in the contact surface pressure between the secondary sealing portion and the secondary sealing groove due to insufficient strength of the thickness portion, so that it is possible to effectively suppress a decrease in the sealing performance by the secondary sealing portion and the secondary sealing groove.

(6) A pipe joint of the present invention is a pipe joint including: a joint body having an external thread portion formed on an outer circumference thereof, and having a flow passage hole formed inside the joint body; a union nut having an internal thread portion formed on an inner circumference thereof and tightened to the external thread portion; and an inner ring connected at an axially outer end portion thereof to the joint body and having a bulge portion which is formed on an outer circumference of an axial inner end portion thereof so as to project and is to be press-fitted into an end portion of a tube, wherein the inner ring includes a cylindrical body portion having a communication hole for providing communication between flow passage holes formed in the joint body and the tube, respectively, an annular primary sealing portion projecting from a radially inner side of an axially outer end portion of the body portion toward an axially outer side and to be press-fitted into an annular primary sealing groove formed at a connection end portion of the flow passage hole of the joint body, and an annular secondary sealing portion projecting from a radially outer side of the axially outer end portion of the body portion toward the axially outer side and to be press-fitted into an annular secondary sealing groove formed on the radially outer side with respect to the primary sealing groove in the joint body, and the primary sealing portion is formed so as to be tapered from an axially inner end thereof toward an axially outer end thereof in an axial cross-sectional view, and has a flat surface extending from a radially outer end of the axially outer end thereof toward the radially inner side.

In the pipe joint of the present invention, in the inner ring, the primary sealing portion formed so as to be tapered from the axially inner end thereof toward the axially outer end thereof has the flat surface extending from the radially outer end toward the radially inner side of the axially outer end, so that the thickness in the radial direction at the axially outer end portion of the primary sealing portion can be larger than that in the conventional art. Accordingly, the strength at an axially outer end portion of the primary sealing portion is higher than that in the conventional art. Thus, when pressfitting the primary sealing portion into the primary sealing groove, it is possible to inhibit the axially outer end portion of the primary sealing portion from falling down toward the radially inner side (communication hole side). As a result, the surface pressure between the contact surfaces of the axially outer end portion of the primary sealing portion and the primary sealing groove is higher than that in the conventional art, so that it is possible to inhibit a fluid from entering between these contact surfaces.

Advantageous Effects of the Invention

According to the present invention, it is possible to inhibit the axially outer end portion of the primary sealing portion from falling down toward the radially inner side.

DETAILED DESCRIPTION

Next, preferred embodiments of the present invention will be described with reference to the accompanying drawings.

First Embodiment

<Entire Configuration of Pipe Joint>

Figure 1:
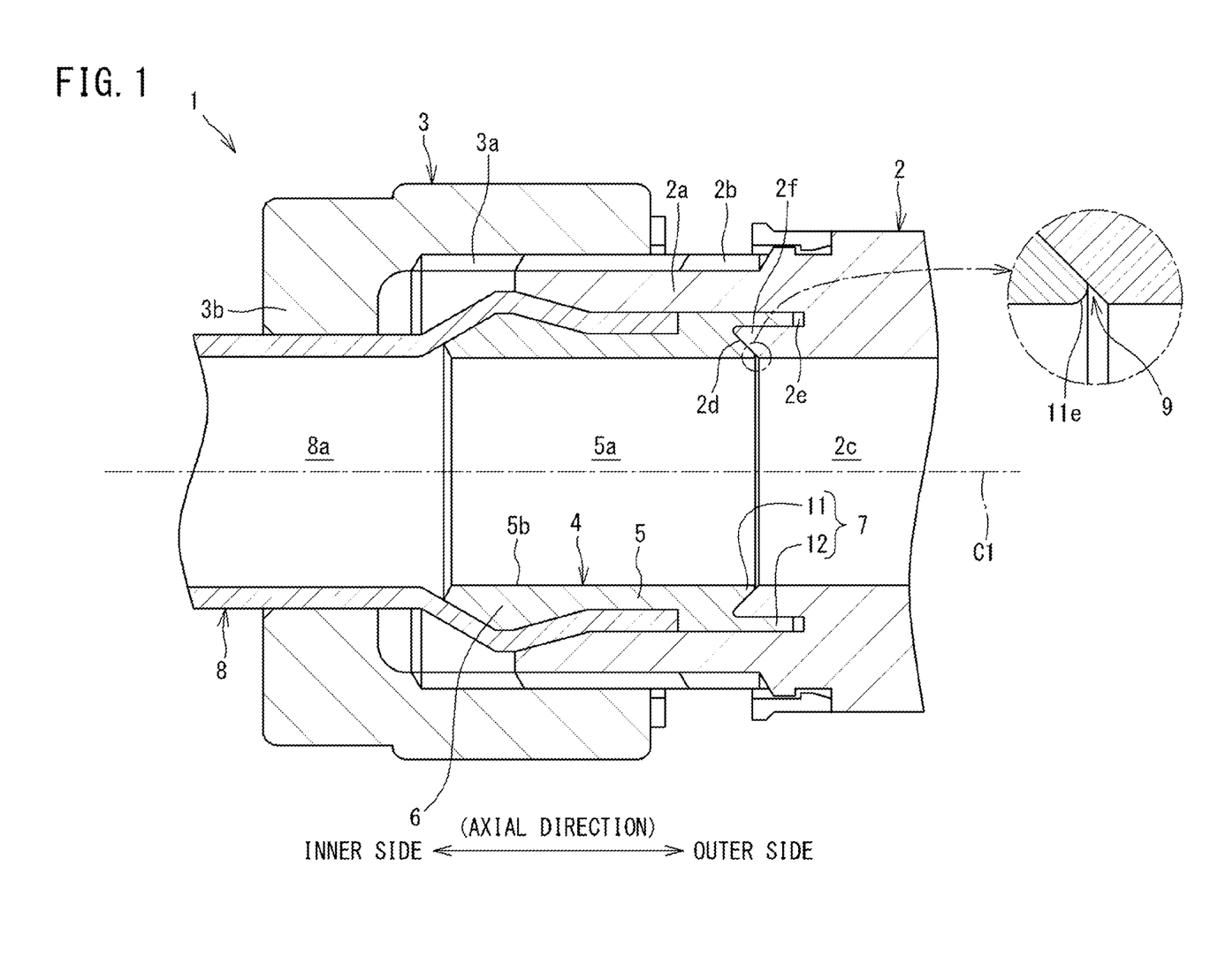
FIG. 1 is an axial cross-sectional view of a pipe joint according to a first embodiment of the present invention.

FIG. 1 is an axial cross-sectional view of a pipe joint according to a first embodiment of the present invention. In FIG. 1, a pipe joint 1 is used, for example, in a pipe path through which a chemical solution (fluid) used in a semiconductor manufacturing apparatus flows. The pipe joint 1 includes a joint body 2, a union nut 3, and an inner ring 4. Hereinafter, in the present embodiment, for convenience, the right side of FIG. 1 is referred to as an axially outer side, and the left side of FIG. 1 is referred to as an axially inner side (the same applies to FIG. 2 and FIG. 3).

The inner ring 4 is formed in a cylindrical shape, for example, from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like). The inner ring 4 includes a body portion 5 formed in a cylindrical shape, a bulge portion 6 formed at an axial inner end portion of the body portion 5, and a connection portion 7 formed at an axially outer end portion of the body portion 5.

The bulge portion 6 is formed at the axial inner end portion of the body portion 5 so as to project toward the radially outer side. The bulge portion 6 is press-fitted into an end portion of a tube 8, which is made of a synthetic resin material (PFA or the like), to increase the diameter of the end portion. The connection portion 7 is connected to an end portion of the joint body 2 and seals a connection portion therebetween. The configuration of the connection portion 7 will be described later. A communication hole 5a which provides communication between a flow passage hole 2c formed inside the joint body 2 and a flow passage hole 8a formed inside the tube 8 is formed inside the body portion 5.

The joint body 2 is formed in a cylindrical shape, for example, from a synthetic resin material such as PVC, PP, PE, or a fluorine resin (PFA, PTI-B, or the like). The inner diameter of the joint body 2 is set to substantially the same dimension as the inner diameter of the body portion 5 of the inner ring 4 such that the movement of the chemical solution is not hindered. A receiving portion 2a is formed at an end portion of the joint body 2. The inner ring 4 press-fitted into the end portion of the tube 8 is fitted to the inner circumference of the receiving portion 2a. Accordingly, the end portion of the joint body 2 is mounted on the outer circumference of the end portion of the tube 8. An external thread portion 2b is formed on the outer circumference of the receiving portion 2a.

The joint body 2 has an annular primary sealing groove 2d and an annular secondary sealing groove 2e which are formed on the radially inner side with respect to the receiving portion 2a. The primary sealing groove 2d is formed on the circumferential surface of a connection end portion of the flow passage hole 2c in a tapered shape that is cut such that the diameter thereof gradually increases from the axially outer end thereof toward the axially inner end thereof. The secondary sealing groove 2e is formed in a cylindrical annular shape on the radially outer side with respect to the primary sealing groove 2d in the joint body 2.

The union nut 3 is formed in a cylindrical shape, for example, from a synthetic resin material such as PVC, PP, PE, or a fluorine resin (PFA, PTFE, or the like). The union nut 3 has an internal thread portion 3a formed on the inner circumference of an axially outer end portion thereof, and a pressing portion 3b formed at an axial inner end portion thereof so as to project toward the radially inner side. The internal thread portion 3a is tightened to the external thread portion 2b of the joint body 2. By the tightening, the union nut 3 is attached to the joint body 2, and an axial inner end portion of the pressing portion 3b also presses the outer circumferential surface of the tube 8 which bulges on the radially outer side by the bulge portion 6 of the inner ring 4.

With the above configuration, by tightening the internal thread portion 3a of the union nut 3 to the external thread portion 2b of the joint body 2, sealing performance at the attachment point between the receiving portion 2a of the joint body 2 and the end portion of the tube 8 can be ensured, and the tube 8 can be prevented from being removed.

<Sealing Configuration of Inner Ring>

Figure 2:
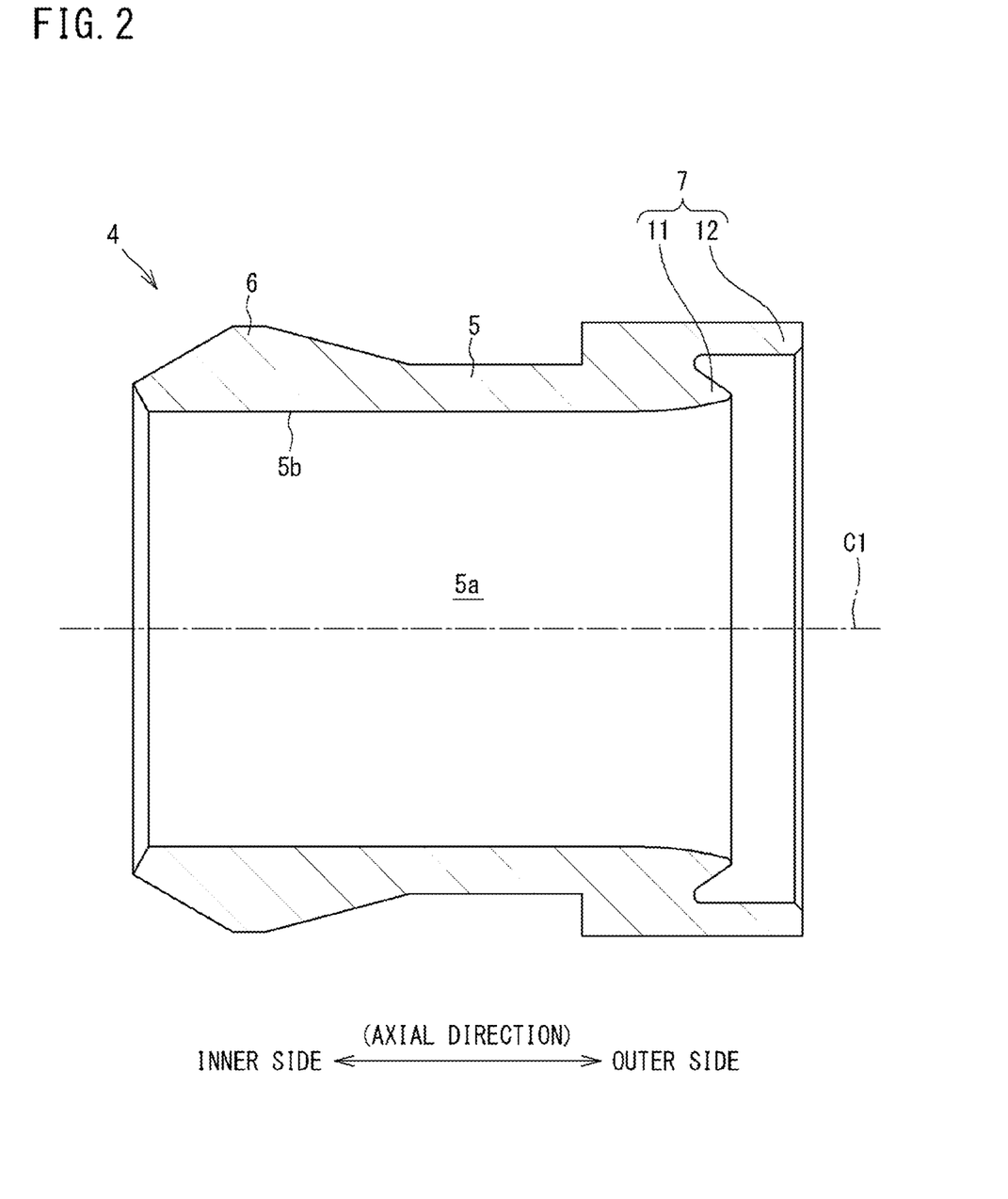
FIG. 2 is an axial cross-sectional view showing an inner ring of the pipe joint.

FIG. 2 is an axial cross-sectional view showing the inner ring 4. In FIG. 1 and FIG. 2, the connection portion 7 of the inner ring 4 includes an annular primary sealing portion 11 and an annular secondary sealing portion 12.

The primary sealing portion 11 is formed so as to project from the radially inner side of the axially outer end portion of the body portion 5 toward the axially outer side. In addition, the primary sealing portion 11 is formed so as to be tapered from the axially inner end thereof toward the axially outer end thereof in an axial cross-sectional view. The primary sealing portion 11 is press-fitted into the primary sealing groove 2d of the joint body 2.

The secondary sealing portion 12 is formed so as to project from the radially outer side of the axially outer end portion of the body portion 5 toward the axially outer side. The secondary sealing portion 12 is formed in a cylindrical annular shape and press-fitted into the secondary sealing groove 2e of the joint body 2.

With the above configuration, since the primary sealing portion 11 and the secondary sealing portion 12 of the inner ring 4 are press-fitted into the primary sealing groove 2d and the secondary sealing groove 2e of the joint body 2, respectively, sealing performance at the connection portion between the inner ring 4 and the joint body 2 can be ensured. Therefore, the inner ring 4 functions as a sealing member that seals and connects the flow passage hole 8a of the tube (fluid device) 8 and the flow passage hole 2c of the joint body (fluid device) 2.

<Configuration of Primary Sealing Portion>

Figure 3:
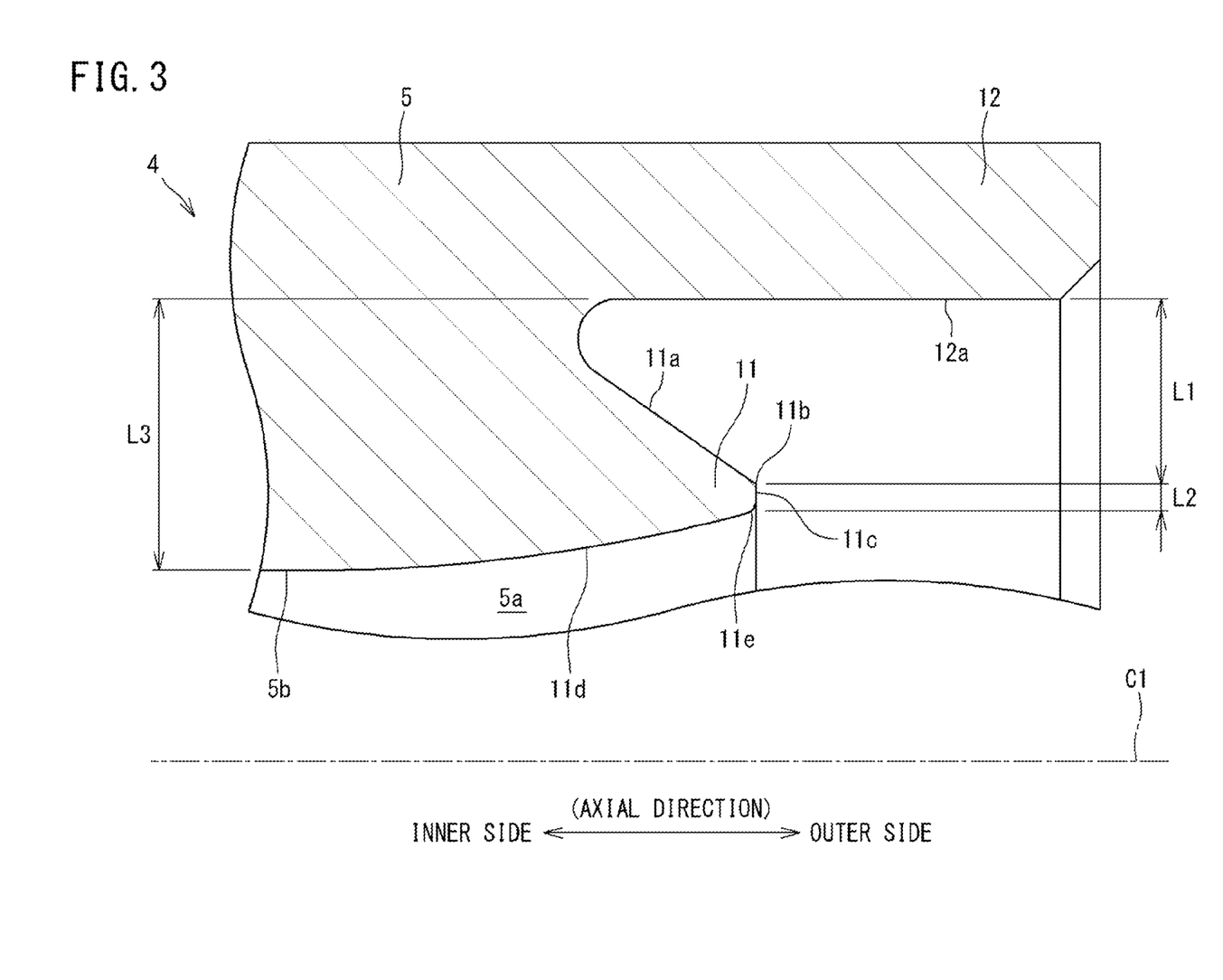
FIG. 3 is an enlarged cross-sectional view of a main part of FIG. 2.

FIG. 3 is an enlarged cross-sectional view of a main part of FIG. 2. In FIG. 3, an outer circumferential surface 11a of the primary sealing portion 11 is formed, so as to match the shape of the primary sealing groove 2d (see FIG. 1), as a tapered surface formed such that the diameter thereof gradually increases from the axially outer end thereof toward the axially inner end thereof.

The primary sealing portion 11 has a flat surface 11c extending from a radially outer end 11b of the axially outer end thereof toward the radially inner side. Here, the "extending toward the radially inner side" means including not only the case of extending from the radially outer end 11b toward the radially inner side along a direction orthogonal to an axis C1 of the inner ring 4, but also the case of extending from the radially outer end 11b toward the radially inner side along a direction slightly inclined with respect to the orthogonal direction.

In the case where the flat surface 11c extends from the radially outer end 11b toward the radially inner side along a direction inclined to the axially outer side with respect to the orthogonal direction, the inclination angle of the flat surface 11c with respect to the orthogonal direction is preferably not less than 1° and not greater than 10°.

In the case where the flat surface 11c extends from the radially outer end 11b toward the radially inner side along a direction inclined to the axially inner side with respect to the orthogonal direction, the inclination angle of the flat surface 11c with respect to the orthogonal direction is preferably not less than 1° and not greater than 20°.

As described above, the primary sealing portion 11 which is formed so as to be tapered from the axially inner end thereof toward the axially outer end thereof has the flat surface 11c at the axially outer end thereof, so that the thickness (thickness dimension L2 described later) in the radial direction at the axially outer end of the primary sealing portion 11 can be larger than that in the conventional art. Accordingly, the strength at an axially outer end portion of the primary sealing portion 11 is higher than that in the conventional art. Thus, when press-fitting the primary sealing portion 11 into the primary sealing groove 2d, it is possible to inhibit the axially outer end portion of the primary sealing portion 11 from falling down toward the radially inner side (communication hole 5a side). As a result, the surface pressure between the contact surfaces of the axially outer end portion of the primary sealing portion 11 and the primary sealing groove 2d is higher than that in the conventional art, so that it is possible to inhibit the chemical solution from entering between these contact surfaces.

An inner circumferential surface 11d of the primary sealing portion 11 is inclined with respect to an inner circumferential surface 5b of the body portion 5 such that the diameter thereof gradually increases from the axially inner end thereof toward the axially outer end thereof. The inner circumferential surface 11d of the primary sealing portion 11 in the present embodiment is inclined to such an extent that, when the primary sealing portion 11 is press-fitted into the primary sealing groove 2d, even if the primary sealing portion 11 falls down toward the radially inner side, the inner circumferential surface 11d does not protrude to the radially inner side with respect to the inner circumferential surface 5b of the body portion 5 (see FIG. 1).

Accordingly, when press-fitting the primary sealing portion 11 into the primary sealing groove 2d, even if the primary sealing portion 11 falls down toward the radially inner side, it is possible to inhibit the inner circumferential surface 11d of the primary sealing portion 11 from protruding to the radially inner side with respect to the inner circumferential surface 5b of the body portion 5. As a result, it is possible to inhibit the flow of the chemical solution in the communication hole 5a of the body portion 5 from being hindered by the inner circumferential surface 11d of the primary sealing portion 11. The inner circumferential surface 11d is inclined in a curved shape in a cross-sectional view, but may be inclined in a linear shape.

The primary sealing portion 11 further has a chamfered portion 11e formed at a corner portion formed by the flat surface 11c and the inner circumferential surface 11d. The chamfered portion 11e of the present embodiment is subjected to R-chamfering, for example. Accordingly, as shown in FIG. 1, when the primary sealing portion 11 is press-fitted into the primary sealing groove 2d, even if the chemical solution enters a recess 9 formed between the corner portion of the primary sealing portion 11 and a radially inner end portion of the primary sealing groove 2d, the chemical solution in the recess 9 easily flows to the communication hole 5a side along the chamfered portion 11e. As a result, it is possible to inhibit the chemical solution from remaining in the recess 9. The chamfered portion 11e may be subjected to C-chamfering.

Referring back to FIG. 3, a radial dimension L1 from the radially outer end 11b of the axially outer end of the primary sealing portion 11 to an inner circumferential surface 12a of the secondary sealing portion 12 is set so as to be larger than the thickness dimension L2 in the radial direction at the axially outer end of the primary sealing portion 11. Here, the "thickness dimension in the radial direction" at the axially outer end means the radial dimension from the radially outer end 11b to the radially inner end (in the present embodiment, the point of intersection of an extension line of the flat surface 11c and an extension line of the inner circumferential surface 11d) at the axially outer end of the primary sealing portion 11.

Accordingly, due to the formation of the flat surface 11c at the axially outer end of the primary sealing portion 11, a thickness portion 2f (see FIG. 1) in the radial direction, of the joint body 2, which is located between the primary sealing portion 11 and the secondary sealing portion 12 can be prevented from being excessively thin. As a result, it is possible to suppress a decrease in the contact surface pressure between the secondary sealing portion 12 and the secondary sealing groove 2e due to insufficient strength of the thickness portion 2f, so that it is possible to suppress a decrease in the sealing performance by the secondary sealing portion 12 and the secondary sealing groove 2e.

The thickness dimension L2 in the radial direction at the axially outer end of the primary sealing portion 11 is set so as to be not less than 10% and not greater than 30% (preferably not less than 10% and not greater than 23%, more preferably not less than 10% and not greater than 20%) of a thickness dimension L3 in the radial direction at the axially inner end of the primary sealing portion 11.

By setting the thickness dimension L2 so as to be not less than 10% of the thickness dimension L3, the strength at the axially outer end portion of the primary sealing portion 11 is further increased. Accordingly, when press-fitting the primary sealing portion 11 into the primary sealing groove 2d, it is possible to further inhibit the axially outer end portion of the primary sealing portion 11 from falling down toward the radially inner side. As a result, the surface pressure between the contact surfaces of the axially outer end portion of the primary sealing portion 11 and the primary sealing groove 2d is further increased, so that it is possible to effectively inhibit the fluid from entering between these contact surfaces.

By setting the thickness dimension L2 so as to be not greater than 30% of the thickness dimension L3, the thickness portion 2f in the radial direction, of the joint body 2, which is located between the primary sealing portion 11 and the secondary sealing portion 12 can be prevented from being excessively thin. As a result, it is possible to further suppress a decrease in the contact surface pressure between the secondary sealing portion 12 and the secondary sealing groove 2e due to insufficient strength of the thickness portion 2f, so that it is possible to effectively suppress a decrease in the sealing performance by the secondary sealing portion 12 and the secondary sealing groove 2e.

Second Embodiment

<Entire Configuration of Flow Passage Joint Structure>

Figure 4:
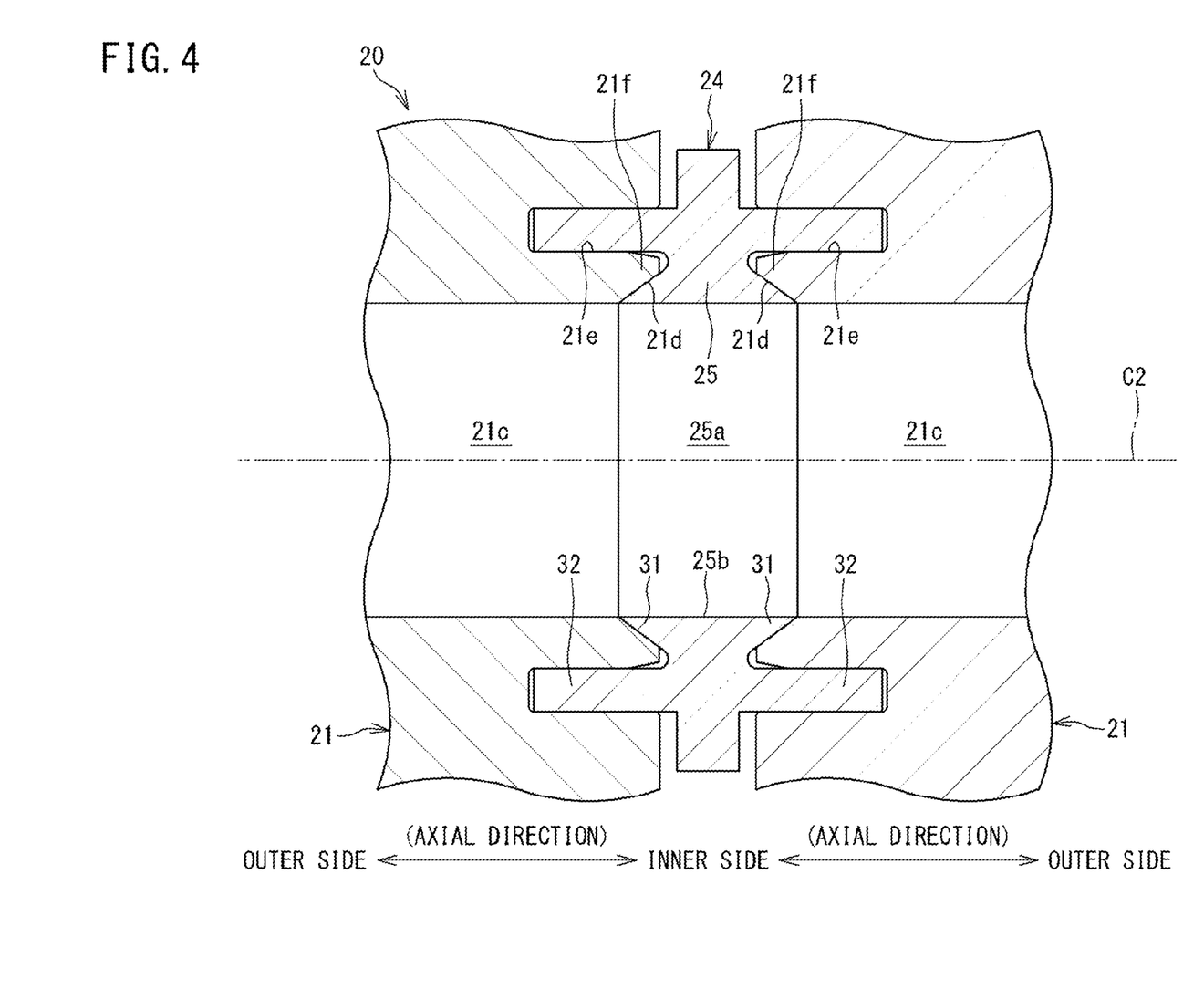
FIG. 4 is an axial cross-sectional view of a flow passage joint structure, in which a sealing member is used, according to a second embodiment of the present invention.

FIG. 4 is an axial cross-sectional view of a flow passage joint structure, in which a sealing member is used, according to a second embodiment of the present invention. In FIG. 4, a flow passage joint structure 20 is used, for example, as a connection structure that connects flow passage holes 21c, 21c formed in two adjacent fluid devices 21, 21, respectively, in a pipe path through which a chemical solution used in a semiconductor manufacturing apparatus flows. Each fluid device 21 of the present embodiment is composed of a pump, a valve, an accumulator, a filter, a flow meter, a pressure sensor, a pipe block, or the like.

The flow passage joint structure 20 includes a gasket 24, and annular primary sealing grooves 21d and annular secondary sealing grooves 21e which are formed on the respective fluid devices 21. The gasket 24 is a sealing member that seals and connects the flow passage holes 21c, 21c of the two fluid devices 21, 21. Hereinafter, in the present embodiment, the directions from the axial center toward both axial sides of the gasket 24 are referred to as an axially outer side, and the directions from both axial sides toward the axial center of the gasket 24 are referred to as an axially inner side.

The primary sealing groove 21d of each fluid device 21 is formed on the circumferential surface of a connection end portion of the flow passage hole 21c in a tapered shape that is cut such that the diameter thereof gradually increases from the axially outer end thereof toward the axially inner end thereof. The secondary sealing groove 21e of each fluid device 21 is formed in a cylindrical annular shape on the radially outer side with respect to the primary sealing groove 21d in each fluid device 21.

<Configuration of Gasket>

Figure 5:
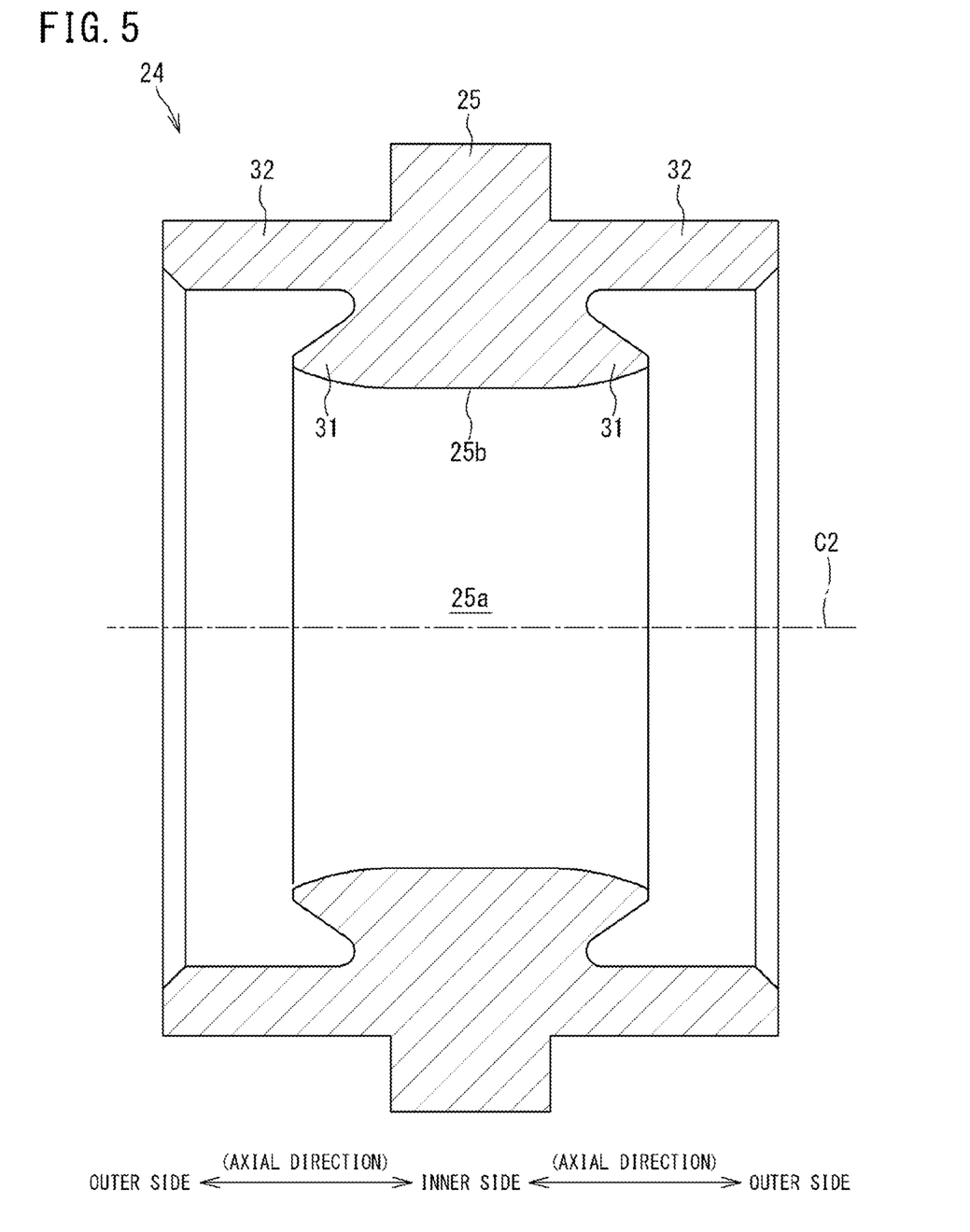
FIG. 5 is an axial cross-sectional view showing a gasket of the flow passage joint structure.

FIG. 5 is an axial cross-sectional view showing the gasket 24. In FIG. 4 and FIG. 5, the gasket 24 includes a body portion 25 formed in a cylindrical shape, a pair of annular primary sealing portions 31, and a pair of annular secondary sealing portions 32.

A communication hole 25a which provides communication between the flow passage holes 21c, 21c of the two fluid devices 21, 21 is formed inside the body portion 25.

The pair of primary sealing portions 31 are formed so as to project from the radially inner sides of outer end portions on both axial sides of the body portion 25, respectively, toward the axially outer side. Each primary sealing portion 31 is formed so as to be tapered from the axially inner end thereof toward the axially outer end thereof in an axial cross-sectional view. Each primary sealing portion 31 is press-fitted into the primary sealing groove 21d of the corresponding fluid device 21.

The pair of secondary sealing portions 32 are formed so as to project from the radially outer sides of the outer end portions on both axial sides of the body portion 25, respectively, toward the axially outer side. Each secondary sealing portion 32 is formed in a cylindrical annular shape and press-fitted into the secondary sealing groove 21e of the corresponding fluid device 21.

With the above configuration, since the pair of primary sealing portions 31 and the pair of secondary sealing portions 32 of the gasket 24 are press-fitted into the primary sealing grooves 21d and the secondary sealing grooves 21e of the respective fluid devices 21, sealing performance at a connection portion between the flow passage holes 21c, 21c in the two fluid devices 21, 21 can be ensured.

<Configuration of Primary Sealing Portion>

Figure 6:
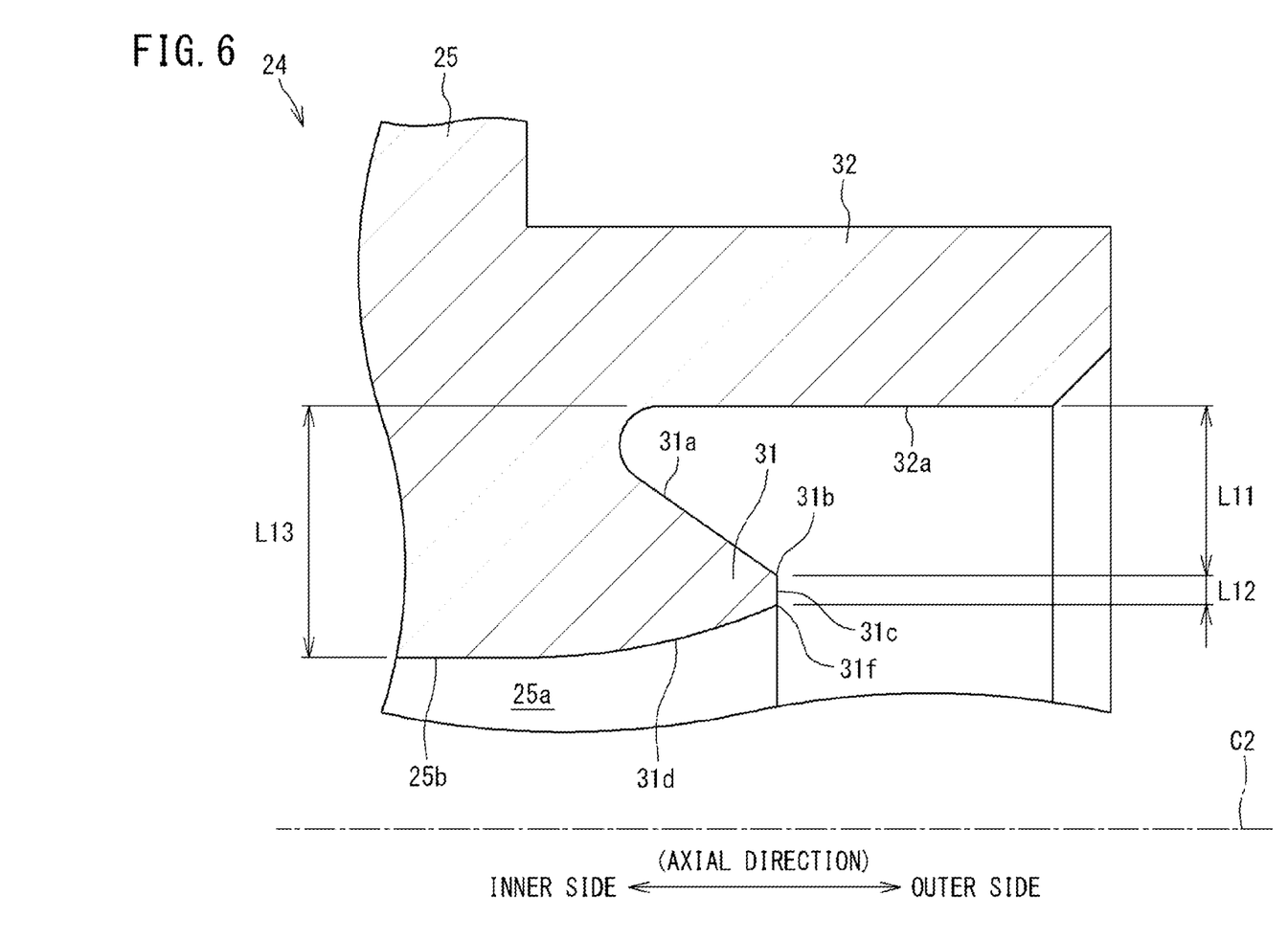
FIG. 6 is an enlarged cross-sectional view of a main part of FIG. 5.

FIG. 6 is an enlarged cross-sectional view of a main part of FIG. 5. In FIG. 6, an outer circumferential surface 31a of the primary sealing portion 31 is formed, so as to match the shape of the primary sealing groove 21d (see FIG. 4), as a tapered surface formed such that the diameter thereof gradually increases from the axially outer end thereof toward the axially inner end thereof.

The primary sealing portion 31 has a flat surface 31c extending from a radially outer end 31b of the axially outer end thereof toward the radially inner side. Here, the "extending toward the radially inner side" means including not only the case of extending from the radially outer end 31b toward the radially inner side along a direction orthogonal to an axis C2 of the gasket 24, but also the case of extending from the radially outer end 31b toward the radially inner side along a direction slightly inclined with respect to the orthogonal direction. In the case where the flat surface 31c extends from the radially outer end 31b toward the radially inner side along a direction inclined with respect to the orthogonal direction, the inclination angle of the flat surface 31c with respect to the orthogonal direction is preferably within 15°.

As described above, the primary sealing portion 31 which is formed so as to be tapered from the axially inner end thereof toward the axially outer end thereof has the flat surface 31c at the axially outer end thereof, so that the thickness (thickness dimension L12 described later) in the radial direction at the axially outer end of the primary sealing portion 31 can be larger than that in the conventional art. Accordingly, the strength at an axially outer end portion of the primary sealing portion 31 is higher than that in the conventional art. Thus, when press-fitting the primary sealing portion 31 into the primary sealing groove 21d, it is possible to inhibit the axially outer end portion of the primary sealing portion 31 from falling down toward the radially inner side (communication hole 25a side). As a result, the surface pressure between the contact surfaces of the axially outer end portion of the primary sealing portion 31 and the primary sealing groove 21d is higher than that in the conventional art, so that it is possible to inhibit the chemical solution from entering between these contact surfaces.

An inner circumferential surface 31d of the primary sealing portion 31 is inclined with respect to an inner circumferential surface 25b of the body portion 25 such that the diameter thereof gradually increases from the axially inner end thereof toward the axially outer end thereof. The inner circumferential surface 31d of the primary sealing portion 31 in the present embodiment is inclined to such an extent that, when the primary sealing portion 31 is press-fitted into the primary sealing groove 21d, even if the primary sealing portion 31 falls down toward the radially inner side, the inner circumferential surface 31d does not protrude to the radially inner side with respect to the inner circumferential surface 25b of the body portion 25 (see FIG. 4).

Accordingly, when press-fitting the primary sealing portion 31 into the primary sealing groove 21d, even if the primary sealing portion 31 falls down toward the radially inner side, it is possible to inhibit the inner circumferential surface 31d of the primary sealing portion 31 from protruding to the radially inner side with respect to the inner circumferential surface 25b of the body portion 25. As a result, it is possible to inhibit the flow of the chemical solution in the communication hole 25a of the body portion 25 from being hindered by the inner circumferential surface 31d of the primary sealing portion 31. The inner circumferential surface 31d is inclined in a curved shape in a cross-sectional view, but may be inclined in a linear shape.

A radial dimension L11 from the radially outer end 31b of the axially outer end of the primary sealing portion 31 to an inner circumferential surface 32a of the secondary sealing portion 32 is set so as to be larger than the thickness dimension L12 in the radial direction at the axially outer end of the primary sealing portion 31. Here, the "thickness dimension in the radial direction" at the axially outer end means the radial dimension from the radially outer end 31b to a radially inner end 31f at the axially outer end of the primary sealing portion 31.

Accordingly, due to the formation of the flat surface 31c at the axially outer end of the primary sealing portion 31, a thickness portion 21f (see FIG. 4) in the radial direction, of the fluid device 21, which is located between the primary sealing portion 31 and the secondary sealing portion 32 can be prevented from being excessively thin. As a result, it is possible to suppress a decrease in the contact surface pressure between the secondary sealing portion 32 and the secondary sealing groove 21e due to insufficient strength of the thickness portion 21f, so that it is possible to suppress a decrease in the sealing performance by the secondary sealing portion 32 and the secondary sealing groove 21e.

The thickness dimension L12 in the radial direction at the axially outer end of the primary sealing portion 31 is set so as to be preferably not less than 5% and not greater than 30%, and more preferably not less than 10% and not greater than 20%, of a thickness dimension L13 in the radial direction at the axially inner end of the primary sealing portion 31.

By setting the thickness dimension L12 so as to be not less than 5% of the thickness dimension L13, the strength at the axially outer end portion of the primary sealing portion 31 is further increased. Accordingly, when press-fitting the primary sealing portion 31 into the primary sealing groove 21d, it is possible to further inhibit the axially outer end portion of the primary sealing portion 31 from falling down toward the radially inner side. As a result, the surface pressure between the contact surfaces of the axially outer end portion of the primary sealing portion 31 and the primary sealing groove 21d is further increased, so that it is possible to effectively inhibit the fluid from entering between these contact surfaces.

By setting the thickness dimension L12 so as to be not greater than 30% of the thickness dimension L13, the thickness portion 21f in the radial direction, of the fluid device 21, which is located between the primary sealing portion 31 and the secondary sealing portion 32 can be prevented from being excessively thin. As a result, it is possible to further suppress a decrease in the contact surface pressure between the secondary sealing portion 32 and the secondary sealing groove 21e due to insufficient strength of the thickness portion 21f, so that it is possible to effectively suppress a decrease in the sealing performance by the secondary sealing portion 32 and the secondary sealing groove 21e.

[Others]

In the primary sealing portion 31 of the second embodiment, similar to the primary sealing portion 11 of the first embodiment, a chamfered portion may be formed at a corner portion formed by the flat surface 31c and the inner circumferential surface 31d.

Moreover, the sealing member of the present invention can also be applied to the liquid crystal/organic EL field, the medical/pharmaceutical field, automotive-related fields, etc., in addition to a semiconductor manufacturing apparatus.

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST 1 pipe joint
2 joint body (fluid device)
2d primary sealing groove
2e secondary sealing groove
3 union nut
4 inner ring (sealing member)
5 body portion
6 bulge portion
11 primary sealing portion
11b radially outer end
11c flat surface
11d inner circumferential surface
11e chamfered portion
12 secondary sealing portion
20 flow passage joint structure
21 fluid device
21d primary sealing groove
21e secondary sealing groove
24 gasket (sealing member)
25 body portion
31 primary sealing portion
31b radially outer end
31c flat surface
31d inner circumferential surface
32 secondary sealing portion

The invention claimed is:

1. A sealing member for sealing and connecting flow passage holes formed in two fluid devices, respectively, the sealing member comprising:
a cylindrical body portion having a communication hole for providing communication between the flow passage holes;
an annular primary sealing portion projecting from a radially inner side of an axially outer end portion of the body portion toward an axially outer side and to be press-fitted into an annular primary sealing groove formed at a connection end portion of the flow passage hole of one of the fluid devices; and
an annular secondary sealing portion projecting from a radially outer side of the axially outer end portion of the body portion toward the axially outer side and to be press-fitted into an annular secondary sealing groove formed on the radially outer side with respect to the primary sealing groove in said one of the fluid devices, wherein
the primary sealing portion is formed so as to be tapered from an axially inner end thereof toward an axially outer end thereof in an axial cross-sectional view, and has a flat surface extending from a radially outer end of the axially outer end thereof toward the radially inner side, and
an inner circumferential surface of the primary sealing portion is inclined with respect to an inner circumferential surface of the body portion such that a diameter thereof gradually increases from an axially inner end thereof toward an axially outer end thereof.

2. A sealing member for sealing and connecting flow passage holes formed in two fluid devices, respectively, the sealing member comprising:
   a cylindrical body portion having a communication hole for providing communication between the flow passage holes;
   an annular primary sealing portion projecting from a radially inner side of an axially outer end portion of the body portion toward an axially outer side and to be press-fitted into an annular primary sealing groove formed at a connection end portion of the flow passage hole of one of the fluid devices; and
   an annular secondary sealing portion projecting from a radially outer side of the axially outer end portion of the body portion toward the axially outer side and to be press-fitted into an annular secondary sealing groove formed on the radially outer side with respect to the primary sealing groove in said one of the fluid devices, wherein
   the primary sealing portion is formed so as to be tapered from an axially inner end thereof toward an axially outer end thereof in an axial cross-sectional view, and has a flat surface extending from a radially outer end of the axially outer end thereof toward the radially inner side, and
   the primary sealing portion has a chamfered portion formed at a corner portion formed by an inner circumferential surface and the flat surface of the primary sealing portion.

3. A sealing member for sealing and connecting flow passage holes formed in two fluid devices, respectively, the sealing member comprising:
   a cylindrical body portion having a communication hole for providing communication between the flow passage holes;
   an annular primary sealing portion projecting from a radially inner side of an axially outer end portion of the body portion toward an axially outer side and to be press-fitted into an annular primary sealing groove formed at a connection end portion of the flow passage hole of one of the fluid devices; and
   an annular secondary sealing portion projecting from a radially outer side of the axially outer end portion of the body portion toward the axially outer side and to be press-fitted into an annular secondary sealing groove formed on the radially outer side with respect to the primary sealing groove in said one of the fluid devices, wherein
   the primary sealing portion is formed so as to be tapered from an axially inner end thereof toward an axially outer end thereof in an axial cross-sectional view, and has a flat surface extending from a radially outer end of the axially outer end thereof toward the radially inner side, and
   a thickness dimension in Mal a radial direction at the axially outer end of the primary sealing portion is not less than 10% and not greater than 30% of a thickness dimension in the radial direction at the axially inner end of the primary sealing portion.

4. A pipe joint comprising:
   a joint body having an external thread portion formed on an outer circumference thereof, and having a flow passage hole formed inside the joint body;
   a union nut having an internal thread portion formed on an inner circumference thereof and tightened to the external thread portion; and
   an inner ring connected at an axially outer end portion thereof to the joint body and having a bulge portion which is formed on an outer circumference of an axial inner end portion thereof so as to project and is to be press-fitted into an end portion of a tube, wherein
   the inner ring includes
      a cylindrical body portion having a communication hole for providing communication between flow passage holes formed in the joint body and the tube, respectively,
      an annular primary sealing portion projecting from a radially inner side of an axially outer end portion of the body portion toward an axially outer side and to be press-fitted into an annular primary sealing groove formed at a connection end portion of the flow passage hole of the joint body, and
      an annular secondary sealing portion projecting from a radially outer side of the axially outer end portion of the body portion toward the axially outer side and to be press-fitted into an annular secondary sealing groove formed on the radially outer side with respect to the primary sealing groove in the joint body,
   the primary sealing portion is formed so as to be tapered from an axially inner end thereof toward an axially outer end thereof in an axial cross-sectional view, and has a flat surface extending from a radially outer end of the axially outer end thereof toward the radially inner side, and
   an inner circumferential surface of the primary sealing portion is inclined with respect to an inner circumferential surface of the body portion such that a diameter thereof gradually increases from an axially inner end thereof toward an axially outer end thereof.

5. A pipe joint comprising:
   a joint body having an external thread portion formed on an outer circumference thereof, and having a flow passage hole formed inside the joint body;
   a union nut having an internal thread portion formed on an inner circumference thereof and tightened to the external thread portion; and
   an inner ring connected at an axially outer end portion thereof to the joint body and having a bulge portion which is formed on an outer circumference of an axial inner end portion thereof so as to project and is to be press-fitted into an end portion of a tube, wherein
   the inner ring includes
      a cylindrical body portion having a communication hole for providing communication between flow passage holes formed in the joint body and the tube, respectively,
      an annular primary sealing portion projecting from a radially inner side of an axially outer end portion of the body portion toward an axially outer side and to be press-fitted into an annular primary sealing groove formed at a connection end portion of the flow passage hole of the joint body, and
      an annular secondary sealing portion projecting from a radially outer side of the axially outer end portion of the body portion toward the axially outer side and to be press-fitted into an annular secondary sealing groove formed on the radially outer side with respect to the primary sealing groove in the joint body,
   the primary sealing portion is formed so as to be tapered from an axially inner end thereof toward an axially outer end thereof in an axial cross-sectional view, and has a flat surface extending from a radially outer end of the axially outer end thereof toward the radially inner side, and the primary sealing portion has a chamfered portion formed at a corner portion formed by an inner circumferential surface and the flat surface of the primary sealing portion.

6. A pipe joint comprising:

a joint body having an external thread portion formed on an outer circumference thereof, and having a flow passage hole formed inside the joint body;

a union nut having an internal thread portion formed on an inner circumference thereof and tightened to the external thread portion; and an inner ring connected at an axially outer end portion thereof to the joint body and having a bulge portion which is formed on an outer circumference of an axial inner end portion thereof so as to project and is to be press-fitted into an end portion of a tube, wherein the inner ring includes a cylindrical body portion having a communication hole for providing communication between flow passage holes formed in the joint body and the tube, respectively, an annular primary sealing portion projecting from a radially inner side of an axially outer end portion of the body portion toward an axially outer side and to be press-fitted into an annular primary sealing groove formed at a connection end portion of the flow passage hole of the joint body, and an annular secondary sealing portion projecting from a radially outer side of the axially outer end portion of the body portion toward the axially outer side and to be press-fitted into an annular secondary sealing groove formed on the radially outer side with respect to the primary sealing groove in the joint body, the primary sealing portion is formed so as to be tapered from an axially inner end thereof toward an axially outer end thereof in an axial cross-sectional view, and has a flat surface extending from a radially outer end of the axially outer end thereof toward the radially inner side, and a thickness dimension in a radial direction at the axially outer end of the primary sealing portion is not less than 10% and not greater than 30% of a thickness dimension in the radial direction at the axially inner end of the primary sealing portion.

\* \* \* \* \*